(12) United States Patent
Haworth

(10) Patent No.: US 12,277,012 B1
(45) Date of Patent: Apr. 15, 2025

(54) REPELLING INPUT DEVICE FROM IMPROPER LOCATION

(71) Applicant: Microsoft Technology Licensing, LLC, Redmond, WA (US)

(72) Inventor: Madeleine Marie Haworth, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 18/263,614

(22) PCT Filed: Jan. 10, 2022

(86) PCT No.: PCT/US2022/011802
§ 371 (c)(1),
(2) Date: Jul. 31, 2023

(87) PCT Pub. No.: WO2022/169552
PCT Pub. Date: Aug. 11, 2022

(30) Foreign Application Priority Data

Feb. 4, 2021 (NL) ..................................... 2027496

(51) Int. Cl.
*G06F 1/16* (2006.01)
*G06F 3/0354* (2013.01)

(52) U.S. Cl.
CPC .......... *G06F 1/1656* (2013.01); *G06F 1/1607* (2013.01); *G06F 3/03545* (2013.01); *G06F 2200/1632* (2013.01)

(58) Field of Classification Search
CPC ....................... G06F 1/1679; G06F 2200/1632
See application file for complete search history.

(56) References Cited

U.S. PATENT DOCUMENTS

| | | | | |
|---|---|---|---|---|
| 4,865,285 A * | 9/1989 | Gaggianese | ......... | B43M 99/004 211/DIG. 1 |
| 6,149,116 A * | 11/2000 | Won | ..................... | B60R 11/0241 379/446 |
| 6,366,440 B1 * | 4/2002 | Kung | ...................... | E05C 19/16 361/679.55 |
| 6,653,919 B2 * | 11/2003 | Shih-Chung | ............ | G06F 1/162 335/207 |

(Continued)

FOREIGN PATENT DOCUMENTS

WO      2018194557 A1     10/2018

OTHER PUBLICATIONS

"DIY Magnetic Pen/Stylus Holder on SD Card for Laptop", Retrieved From: https://www.instructables.com/DIY-Magnetic-PenStylus-Holder-on-SD-Card-for-Lapto/, Dec. 9, 2020, 10 Pages.

(Continued)

*Primary Examiner* — Adrian S Wilson
(74) *Attorney, Agent, or Firm* — Alleman Hall & Tuttle LLP

(57) ABSTRACT

A computing system for preventing at least a portion of an input device from attaching to an improper location on a computing device is disclosed. In one example, the input device comprises first and second input device magnets spaced by a separation distance and having a first magnetic pole orientation. The computing device comprises a housing with a first side and a first end adjacent to the first side, and first and second computing device magnets spaced by the separation distance and having a second magnetic pole orientation opposite to the first magnetic pole orientation. At least one repelling magnet having the first magnetic pole orientation is located between the first end of the housing and the second computing device magnet to repel the second input device magnet of the input device.

20 Claims, 10 Drawing Sheets

(56) References Cited

U.S. PATENT DOCUMENTS

| | | | | |
|---|---|---|---|---|
| 7,775,567 | B2* | 8/2010 | Ligtenberg | E05C 19/16 |
| | | | | 292/DIG. 37 |
| 8,264,310 | B2 | 9/2012 | Lauder et al. | |
| 9,507,381 | B1* | 11/2016 | Vanderet | G06F 3/03545 |
| 9,590,352 | B2 | 3/2017 | Bilbrey et al. | |
| 10,139,926 | B2* | 11/2018 | Murauyou | G06F 1/1626 |
| 2008/0297328 | A1* | 12/2008 | Crawford | A63F 13/285 |
| | | | | 340/407.2 |
| 2014/0049894 | A1* | 2/2014 | Rihn | G06F 1/1616 |
| | | | | 335/219 |
| 2021/0200340 | A1* | 7/2021 | Burks | G06F 1/1643 |
| 2023/0067384 | A1* | 3/2023 | Thome | G06F 1/1643 |

OTHER PUBLICATIONS

Abhijeet, M, "Samsung Galaxy Tab S6 Lite review: Bringing the S Pen to the masses", Retrieved From: https://www.sammobile.com/samsung/galaxy-tab-s6-lite/review, Jun. 25, 2020, 28 Pages.

Keller, Joseph, "Which Apple Pencil works with iPad Air 4", Retrieved From: https://web.archive.org/web/20201025223513/https://www.imore.com/which-apple-pencil-works-ipad-air-4, Sep. 25, 2020, 6 Pages.

Krishna, Sai, "OPPO patent hints at a smartphone with stylus support", Retrieved From: https://www.androidheadlines.com/2020/02/oppo-patent-smartphone-stylus-calls-bluetooth.html, Feb. 13, 2020, 2 Pages.

Litchfield, Steve, "Review: Surface Go—part 5: The Pen on the Go", Retrieved From: http://allaboutwindowsphone.com/reviews/item/23304_Surface_Go-part_5_The_Pen_on_t.php, Dec. 13, 2018, 19 Pages.

"Search Report Issued in Netherland Patent Application No. N2027496", Mailed Date: Nov. 9, 2021, 12 Pages.

"International Search Report and Written Opinion Issued in PCT Application No. PCT/US22/011802", Mailed Date: Jul. 20, 2022, 14 Pages.

Rubino, Daniel, "Surface Pro 5 may have a rechargeable Surface Pen that docks magnetically", Retrieved From: https://www.windowscentral.com/surface-pro-5-may-have-rechargeable-surface-pen-docks-magnetically, Nov. 29, 2018, 7 Pages.

* cited by examiner

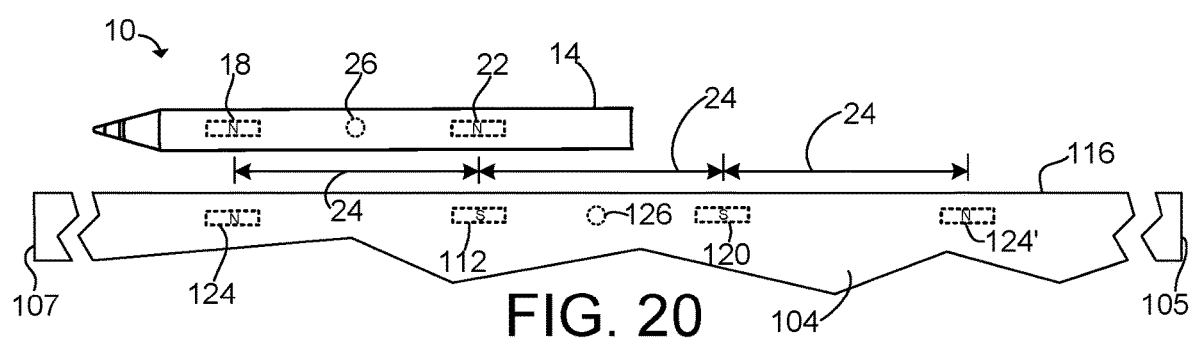
FIG. 20
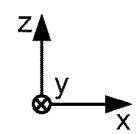

```
┌─────────────────────────────────────────┐
│ PROVIDE A COMPUTING DEVICE COMPRISING: A HOUSING
│ COMPRISING A FIRST SIDE AND A FIRST END ADJACENT TO
│ THE FIRST SIDE; A FIRST COMPUTING DEVICE MAGNET
│ ALONG THE FIRST SIDE, THE FIRST COMPUTING DEVICE
│ MAGNET HAVING A SECOND MAGNETIC POLE
│ ORIENTATION OPPOSITE TO THE FIRST MAGNETIC POLE
│ ORIENTATION OF THE FIRST INPUT DEVICE MAGNET AND
│ THE SECOND INPUT DEVICE MAGNET OF THE INPUT
│ DEVICE; A SECOND COMPUTING DEVICE MAGNET ALONG
│ THE FIRST SIDE OF THE HOUSING AND SPACED BY THE
│ SEPARATION DISTANCE FROM THE FIRST COMPUTING
│ DEVICE MAGNET, THE SECOND COMPUTING DEVICE
│ MAGNET HAVING THE SECOND MAGNETIC POLE
│ ORIENTATION; AND AT LEAST ONE REPELLING MAGNET
│ ALONG THE FIRST SIDE OF THE HOUSING AND LOCATED
│ BETWEEN THE FIRST END OF THE HOUSING AND THE
│ SECOND COMPUTING DEVICE MAGNET, THE REPELLING
│ MAGNET HAVING THE FIRST MAGNET POLE ORIENTATION
│                    304
└─────────────────────────────────────────┘
                     │
                     ▼
┌─────────────────────────────────────────┐
│ CAUSING THE REPELLING MAGNET TO REPEL THE
│ SECOND INPUT DEVICE MAGNET OF THE INPUT DEVICE
│ WHEN THE SECOND INPUT DEVICE MAGNET IS MOVED
│ PROXIMATE TO THE AT LEAST ONE REPELLING MAGNET
│                    308
└─────────────────────────────────────────┘
```

FIG. 21

REPELLING INPUT DEVICE FROM IMPROPER LOCATION

CROSS REFERENCE TO RELATED APPLICATIONS

The present application is a U.S. National Phase of International Patent Application Serial No. PCT/US2022/011802 entitled "REPELLING INPUT DEVICE FROM IMPROPER LOCATION", filed Jan. 10, 2022, which claims priority to Netherlands Patent Application Serial No. 2027496, filed Feb. 4, 2021, the entire contents of each of which are hereby incorporated by reference for all purposes.

BACKGROUND

Some input devices, such as electronic styluses and pens, can be magnetically attached to corresponding locations on computing devices. In some cases such input devices can be moved or otherwise attached to an improper location on the computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing systems, computing devices, input devices and methods for preventing at least a portion of an input device from attaching to an improper location on a computing device. In one example a computing system includes an input device and a computing device for preventing at least a portion of the input device from attaching to an improper location on the computing device. The input device includes an elongated tubular body and a first input device magnet along the body and having a first magnetic pole orientation. A second input device magnet is spaced by a separation distance from the first input device magnet along the elongated body, and the second input device magnet also has the first magnetic pole orientation.

The computing device comprises a housing that includes a first side and a first end adjacent to the first side. A first computing device magnet is located along the first side of the housing and has a second magnetic pole orientation that is opposite to the first magnetic pole orientation. A second computing device magnet is also located along the first side of the housing and is spaced by the separation distance from the first computing device magnet, with the second computing device magnet also having the second magnetic pole orientation.

The computing device further includes at least one repelling magnet along the first side of the housing and located between the first end of the housing and the second computing device magnet. The at least one repelling magnet has the first magnetic pole orientation to repel the second input device magnet of the input device.

In another example a computing device is disclosed for preventing at least a portion of an input device from attaching to an improper location on the computing device. The computing device comprises a housing comprising a first side and a first end adjacent to the first side. A first computing device magnet is located along the first side of the housing and has a first magnetic pole orientation opposite to a second magnetic pole orientation. A second computing device magnet is located along the first side of the housing and is spaced by a separation distance from the first computing device magnet, with the second computing device magnet having the second magnetic pole orientation. At least one repelling magnet is located along the first side of the housing and between the first end of the housing and the second computing device magnet. The at least one repelling magnet has either the first magnetic pole orientation or the second magnetic pole orientation to repel an input device magnet of the input device.

In another example, a method is provided at a computing device for preventing at least a portion of an input device from attaching to an improper location on the computing device. The input device comprises a first input device magnet with a first magnetic pole orientation and a second input device magnet with the first magnetic pole orientation spaced by a separation distance from the first input device magnet.

The method comprises providing the computing device that includes a housing comprising a first side and a first end adjacent to the first side; a first computing device magnet located along the first side of the housing and having a second magnetic pole orientation opposite to the first magnetic pole orientation of the input device; a second computing device magnet located along the first side of the housing, spaced by the separation distance from the first computing device magnet, and having the second magnetic pole orientation; and at least one repelling magnet located along the first side of the housing between the first end of the housing and the second computing device magnet, wherein the repelling magnet has the first magnetic pole orientation.

The method further includes causing the repelling magnet to repel the second input device magnet of the input device when the second input device magnet is moved proximate to the at least one repelling magnet.

BRIEF DESCRIPTION OF THE DRAWINGS

FIG. 20 schematically depicts another example of a computing device repelling portions of an input device from attaching to an improper location according to examples of the present disclosure.

FIG. 21 illustrates an example method at a computing device for preventing at least a portion of an input device from attaching to an improper location on the computing device according to examples of the present disclosure.

DETAILED DESCRIPTION

Figure 1:
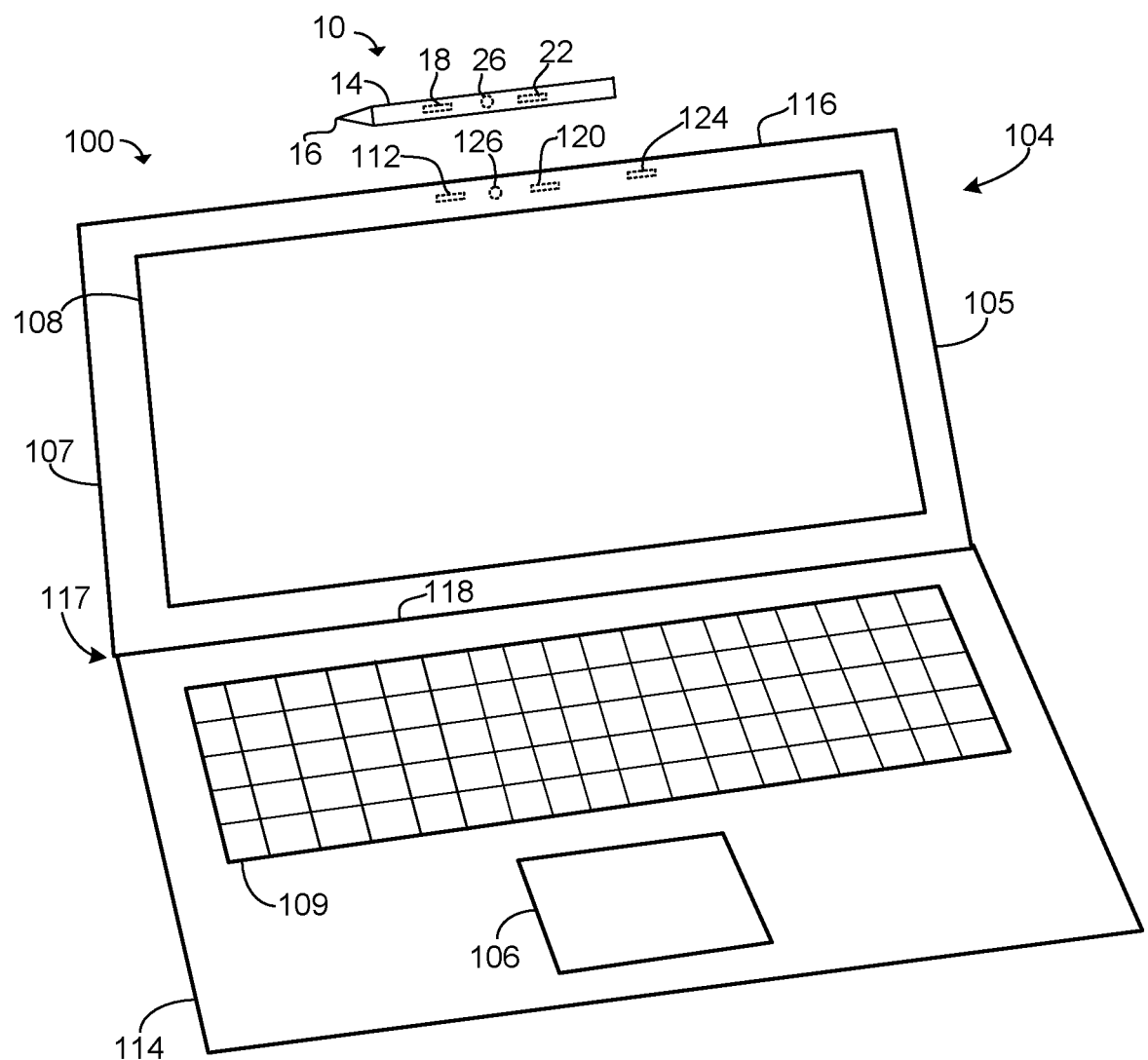
FIG. 1 schematically depicts an example of an input device and a computing device for preventing at least a portion of the input device from attaching to an improper location on the computing device according to examples of the present disclosure.

In some examples of electronic input devices, such as styluses and pens, the device can be magnetically attached to corresponding locations on a computing device, such as a tablet or laptop computer. As the input device is moved closer to the computing device, one or more magnets in the computing device pull the input device to magnetically attach to the surface of the computing device.

In some devices, the strength of these magnets makes it possible for the input device to attach to the computing device in the wrong location. For example, where an input device and a computing device each utilize a pair of magnets, the input device can be positioned or moved to an improper location at which just one magnet of the input device is proximate to and attracted by one magnet in the computing device (i.e., a left magnet in input device attracts to a right magnet on the computing device, or vice versa). In these cases, the other magnet of the input device is distanced from the other corresponding magnet in the computing device with weak or negligible magnetic attraction between the two. Accordingly, the input device is not securely attached to the computing device and could be easily dislodged or fall off.

Further, some input devices also include wireless charging functionality that enables the device to be wirelessly charged by corresponding components, such as an inductive charging coil, in the computing device. In some examples these computing devices can locate the charging coil between two magnets on either side of the coil. When an input device with two corresponding magnets is magnetically secured to the computing device magnets at this charging location, a corresponding charging coil in the input device is aligned with and positioned close to the charging coil in the computing device, and the input device can be wirelessly charged. However, and as noted above, in some cases the input device can be positioned or moved to an improper location such that just one magnet of the input device is proximate to and attracted by one magnet in the computing device, with the input device being offset from the desired charging position.

In this scenario, the input device is offset from its proper location, the charging coils are not aligned, and the input device therefore is not wirelessly charged. However, to the user the input device can still appear to be attached to the computing device, and this may cause the user to falsely believe the input device is securely attached and charging.

The present disclosure describes computing systems including computing devices and input devices for preventing at least a portion of an input device from attaching to an improper location on a computing device. As will be described in more detail below, one or more repelling magnets are specifically located in the computing device to repel the input device from being attached at an improper location. The repelling magnet(s) also provide haptic feedback to signal the user that the input device is not located properly. Further, aspects of the present disclosure enable computing devices to ensure proper and secure attachment of an input device while also avoiding or making optional the use of additional charging coils or markings on the computing device.

FIG. 1 illustrates an example input device 10 in the form of an electronic pen and an example computing device 100 in the form of a tablet computer that include aspects of the present disclosure. In this example the input device 10 comprises an elongated tubular body 14 that can have any suitable cross section, such as circular, oblong or rectangular. As described in more detail below, the input device 10 includes a first input device magnet 18 and a second input device magnet 22 spaced from the first input device magnet along the body 14 of the input device. In this example the first input device magnet 18 and the second input device magnet 22 are both located inside and beneath the exterior surface of the body 14 such that they are not visible to a user.

In this example the input device 10 further includes an input device wireless charging coil 26 to receive and provide power to a power storage device in the input device. The input device wireless charging coil 26 is located inside and beneath the exterior surface of the body 14 such that it is not visible to a user. The input device wireless charging coil 26 is positioned between and colinear with the first computing device magnet 18 and the second computing device magnet 22. A current can be induced in the input device wireless charging coil 26 by placing the coil near a corresponding charging coil. In the example of FIG. 1 and as described further below, the computing device 100 includes a computing device wireless charging coil 126 configured to induce current in the input device wireless charging coil 26 of the input device 10 when the input device is magnetically attached and positioned in a charging orientation on the computing device. When the input device 10 is in the charging orientation and attached to the two computing device magnets, the input device wireless charging coil 26 is aligned with and positioned close to the computing device wireless charging coil 126 as shown in examples below. The computing device wireless charging coil 26 is located inside the housing 104 such that it is not visible to a user.

The computing device 100 comprises a housing 104 that includes a first end 105 and an opposing second end 107. The housing 104 includes a display screen 108 that may utilize any suitable display technology and may have any suitable size and resolution. As examples, the display screen may be a liquid crystal display (LCD), light emitting diode (LED) display, plasma display, quantum dot display (QLED), e-ink/e-paper display, or other suitable display type.

As described in more detail below, the housing 104 includes a first computing device magnet 112 and a second computing device magnet 120 spaced from the first computing device magnet along a first side 116 of the housing. As described in more detail below, the housing 104 further includes a repelling magnet 124 along the first side 116 of the housing and located between the first end 105 of the housing and the second computing device magnet 120.

A base portion 114 is rotatably coupled to the housing 104 at a hinge 117 adjacent to the second side 118 of the housing. In some examples the base portion 114 is removably coupled to the second side 118 of the housing 104. In this example the base portion 114 includes a trackpad 106 and a keyboard 109. Additional details regarding the components and computing aspects of computing device 100 are described in more detail below with reference to the example computing system of FIG. 22.

Components of computing device 100 may be composed or constructed from any suitable materials. As examples, the housing 104 and base portion 114 may be constructed from one or more suitable plastics, metal alloys (e.g., aluminum, magnesium), ceramics, etc. Suitable paints, coatings, or finishes may optionally be applied. For example, the base portion 114 may comprise or be covered in a natural or synthetic fabric.

It will be understood that computing device 100 and input device 10 as described herein are presented as nonlimiting examples for illustrative purposes. Other computing devices and input devices contemplated by this disclosure may have alternate shapes, sizes, dimensions, and form factors. For example, computing devices in which aspects of the present disclosure may be utilized or practiced may include any suitable collection of input/output devices and other hardware components. Additionally and as described further below, examples of computing devices according to the present disclosure may have different numbers of computing device magnets and repelling magnet(s), and such magnets may be positioned at a variety of locations on the computing device according to different design considerations. Other types of input devices in which aspects of the present disclosure may be utilized or practiced include wearable devices such as watches and glasses. Additionally, as used herein the term "magnet" includes a single magnet and assemblies or arrangements of magnets, such as a Halbach array. Also as used herein, the term "magnetic pole orientation" includes a single pair of magnetic poles and multiple pairs of magnetic poles that may be arranged in a pattern.

Figure 2:
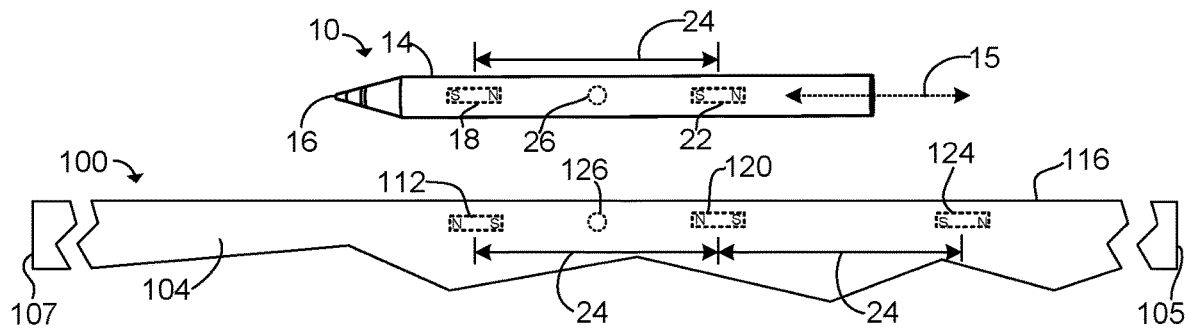
FIGS. 2 and 3 schematically depict an example of the input device attaching to a proper attaching location on the computing device according to examples of the present disclosure.

With reference now to FIG. 2, the input device 10 and a portion of computing device 100 are shown. In this example, the first input device magnet 18 and second input device magnet 22 both have a first magnetic pole orientation in which the south pole of the magnet is positioned closer to the tip 16 of the input device than the north pole of the magnet. The first input device magnet 18 and second input device magnet 22 are colinear and arranged along a line parallel to the longitudinal axis 15 of the body 14 of the input device 10. In other examples, the magnetic pole orientation of the first input device magnet 18 and second input device magnet is reversed, with the magnetic pole orientations of the computing device magnets and repelling magnet described below also reversed.

The first input device magnet 18 and second input device magnet 22 are spaced from one another along the longitudinal axis 15 of the input device body 14 by a separation distance 24. In various examples any suitable separation distance may be utilized. In one example where the overall length of the input device 10 is approximately 15 cm., the separation distance is approximately 6 cm. In the present example the separation distance 24 is measured between the centers of the first input device magnet 18 and second input device magnet 22. In other examples the separation distance 24 may be measured between other corresponding locations on the magnets.

To magnetically attract the input device 10 to a desired location on the computing device 100, in the computing device the first computing device magnet 112 and second computing device magnet 120 have a second magnetic pole orientation that is opposite to the first magnetic pole orientation of the first input device magnet 18 and second input device magnet 22 of the input device. With reference to FIGS. 1 and 2, the first computing device magnet 112 and second computing device magnet 120 both have a second magnetic pole orientation in which the north pole of the magnet is positioned closer to the second end 107 of the housing 104 than the south pole of the magnet. Additionally, the first computing device magnet 112 is spaced from the second computing device magnet 120 by the same separation distance 24 that separates the first input device magnet 18 and second input device magnet 22.

With this configuration, the input device 10 can be positioned in an attaching/charging orientation relative to the computing device 100 as shown in FIG. 2, in which the longitudinal axis 15 of the input device is substantially parallel to the first side 116 of the computing device, and the tip 16 of the input device points toward the second end 107 of the housing 104. Accordingly and with reference to FIG. 3, as the input device 10 is moved closer to the computing device 100, the magnetic fields of the first input device magnet 18 and second input device magnet 22 are attracted to the opposing magnetic fields of the first computing device magnet 112 and second computing device magnet 120, and the input device is magnetically pulled and attached to the housing 104 at an attaching location 130 on the computing device as shown. Additionally, and in this example, when the input device 10 is secured to the computing device at the attaching location 130, the input device charging coil 26 is aligned with and positioned directly adjacent to the computing device wireless charging coil 126 to enable efficient wireless charging of the input device. As shown in FIG. 2, the computing device wireless charging coil 126 is positioned between and colinear with the first computing device magnet 112 and the second computing device magnet 120.

Figure 4:
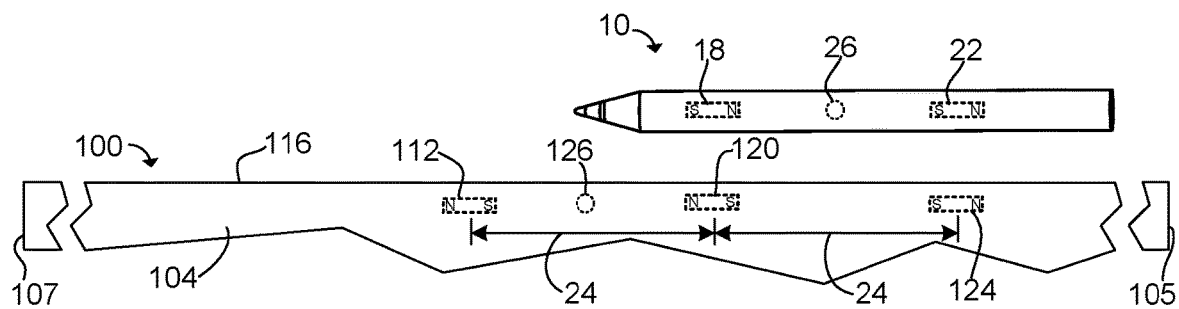
FIGS. 4 and 5 schematically depict an example of the computing device repelling a portion of the input device from attaching to an improper location according to examples of the present disclosure.

As noted above, in some cases the input device can be positioned or moved such that just one magnet of the input device is proximate to and attracted by one magnet in the computing device, and the input device is offset from the attaching location 130. For example, FIG. 4 shows the input device 10 positioned such that the first input device magnet 18 is above and vertically aligned with the second computing device magnet 120. In this and other similar scenarios, a single computing device magnet can attract a single input device magnet to pull the input device to an improper and undesirable location on the computing device. In such an offset location charging coils in the input device and computing device may not be aligned and wireless charging of the input device may not occur. However, the user may perceive the input device to be properly attached and may falsely believe the input device is securely attached and charging.

Accordingly, and in one potential advantage of the present disclosure, the computing device 100 includes at least one repelling magnet having the same first magnetic pole orientation as the input device magnets to repel the input device magnets of the input device in these situations. In the example of FIGS. 2-5, the computing device includes a single repelling magnet 124 along the first side 116 of the housing 104 and located between the first end 105 of the housing and the second computing device magnet 120. The repelling magnet 124 has a magnetic pole orientation opposite to the magnetic pole orientation of the first computing device magnet 112 and the second computing device magnet 120. As shown in this example, the repelling magnet 124, the first computing device magnet 112, and the second computing device magnet 120 are colinear and arranged parallel to the first side of the computing device. Additionally, the repelling magnet 124 is spaced from the second computing device magnet 120 by the same separation distance 24.

In this example the repelling magnet 124 is a single permanent magnet. In other examples and as described further below, the computing device 100 may include two or more repelling magnets at different locations in the housing 104.

Figure 5:
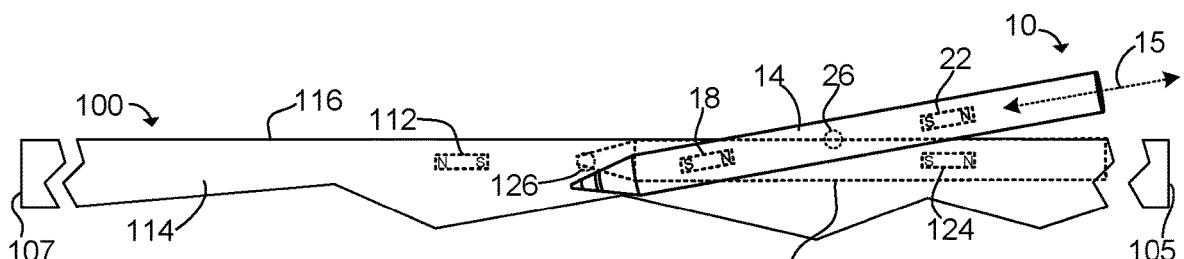

As shown in FIGS. 4 and 5, with this configuration the input device 10 may be moved downwardly toward the computing device 100 such that first input device magnet 18 approaches the second computing device magnet 120 and second input device magnet 22 approaches the repelling magnet 124. As shown in FIG. 5, while first input device magnet 18 and second computing device magnet 120 are attracted to one another, the repelling magnet 124 repels the second input device magnet 22 to prevent at least a portion of the input device from attaching to an improper location, such as the improper location 132 indicated in dotted lines.

Advantageously, by repelling the second input device magnet 22 as it is moved proximate to the repelling magnet 124, this configuration prevents at least a portion of the input device 10 from attaching to the computing device 100 in an orientation that could be misperceived as a proper attaching location on the computing device. In this manner, and in another potential advantage of the present disclosure, the repellent magnetic fields of the second input device magnet 22 and repelling magnet 124 provide haptic feedback to the user's hand that clearly indicate improper placement of the input device 10 relative to the computing device 100.

Additionally and as shown in FIG. 5, even in situations where the input device 10 is magnetically held via attraction between the first input device magnet 18 and the second computing device magnet 120, the input device body 14 and its longitudinal axis 15 are skewed at an angle relative to the first side 116 of the computing device, and are clearly offset relative to the proper positioning of the input device at the attaching location 130. In this manner, this configuration also provides clear visual communication to the user that the input device 10 is not properly attached and should be moved and reattached in the proper location. Further, this configuration enables the computing device 100 to ensure proper and secure attachment of the input device 10 while also avoiding or making optional additional charging coils or undesirable markings or visual indicators on the housing 104 that show the proper attachment location for the input device.

Figure 6:
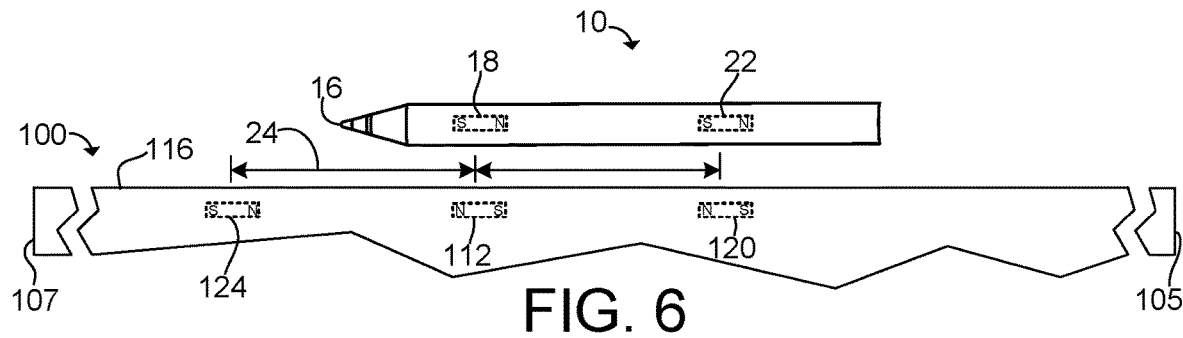
FIGS. 6-8 schematically depict another example of a computing device repelling a portion of the input device from attaching to an improper location according to examples of the present disclosure.
Figure 7:
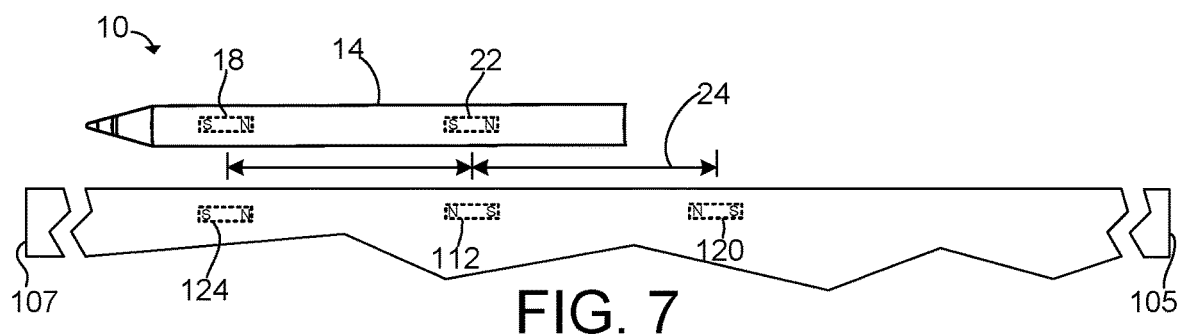
Figure 8:
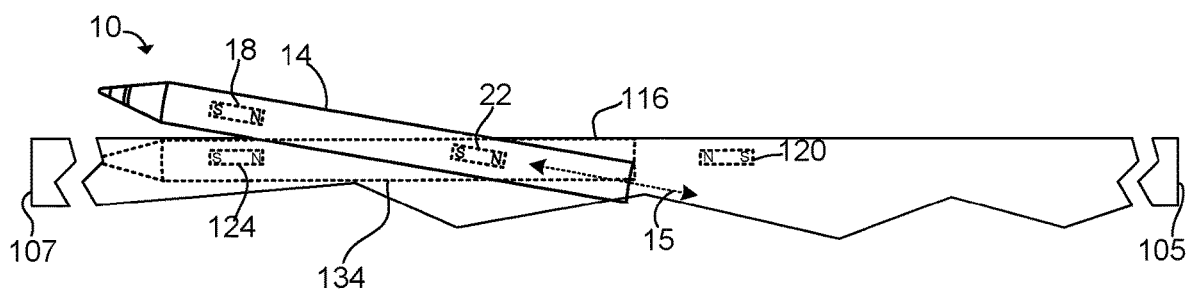

With reference now to FIGS. 6-8, in another example the computing device 100 may utilize a repelling magnet 124 that is located along the first side 116 of the housing 104 and on the other side of the two computing device magnets. In this example the repelling magnet 124 is located between the second end 107 of the housing 104 and the first computing device magnet 112. In this example, neither the input device 10 nor the computing device 100 includes a wireless charging coil. Similar to the example described above, in this example the repelling magnet 124 is spaced from the nearest first computing device magnet 112 by the separation distance 24.

Accordingly and with reference to FIGS. 7 and 8, with this configuration the input device 10 may be moved downwardly toward the computing device 100 such that first input device magnet 18 approaches the repelling magnet 124 and second input device magnet 22 approaches the first computing device magnet 112. As shown in FIG. 8, while the second input device magnet 22 and first computing device magnet 112 are attracted to one another, the repelling magnet 124 repels the first input device magnet 18 to prevent at least this portion of the input device from attaching to an improper location on the computing device 100, such as the improper location 134 indicated in dotted lines.

Advantageously and similarly to the example described above, by repelling the first input device magnet 18 as it is moved proximate to the repelling magnet 124, this configuration prevents at least a portion of the input device 10 from attaching to the computing device 100 in another orientation that could be misperceived as the proper attaching location on the computing device. In this manner and as noted above, the repellent magnetic fields of the first input device magnet 18 and repelling magnet 124 provide haptic feedback to the user holding the input device 10 that clearly indicates improper placement of the input device relative to the computing device 100.

Figure 3:
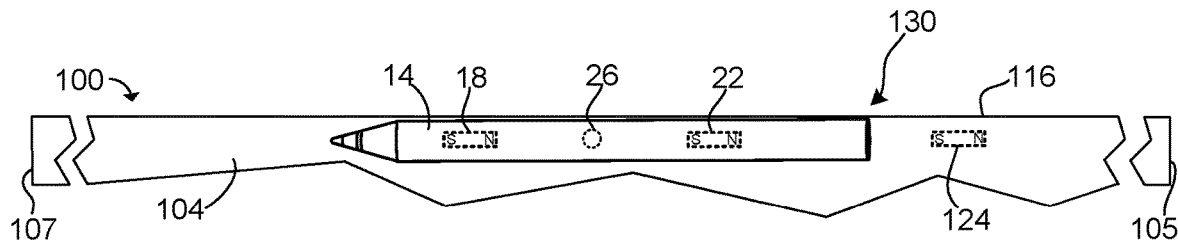

Additionally and as shown in FIG. 8, even in situations where the input device 10 is magnetically held via attraction between the second input device magnet 22 and the first computing device magnet 112, the input device body 14 and its longitudinal axis 15 are skewed at an angle relative to the first side 116 of the computing device, and are clearly offset relative to the proper positioning of the input device at the attaching location 130 shown in FIG. 3. In this manner, this configuration also provides clear visual communication to the user that the input device 10 is not properly attached. Further and as noted above, this configuration enables the computing device 100 to ensure proper and secure attachment of the input device 10 while also avoiding or making optional the use of undesirable markings or visual indicators on the housing 104 that show the proper attachment location for the input device.

Figure 9:
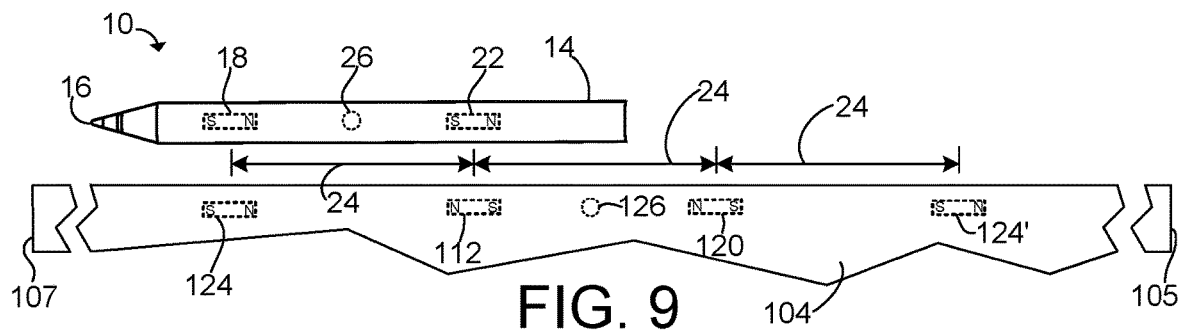
FIGS. 9-11 schematically depict another example of a computing device repelling portions of the input device from attaching to an improper location according to examples of the present disclosure.
Figure 10:
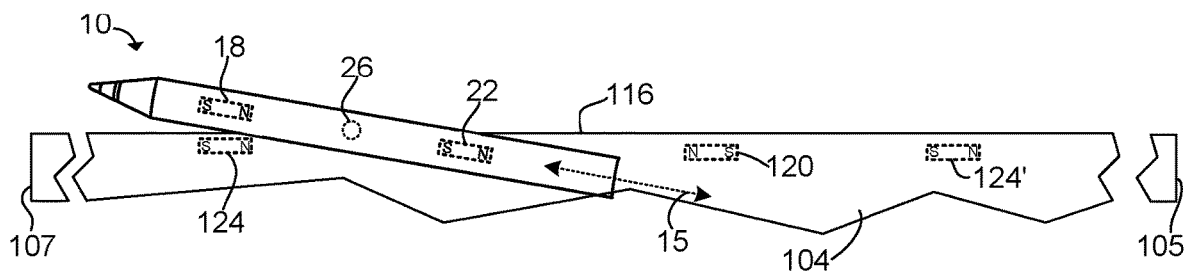
Figure 11:
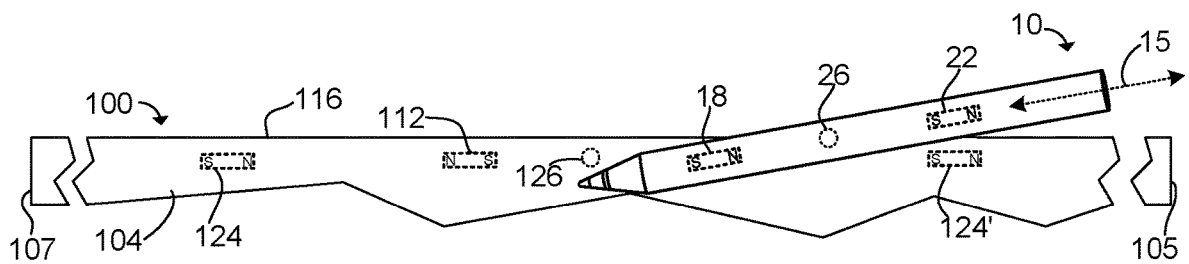

In other examples, the computing device may utilize a plurality of repelling magnets having the first magnetic pole orientation to repel the input device magnets of an input device. With reference now to FIGS. 9-11, in one example the computing device 100 may utilize two repelling magnets 124 located along the first side 116 of the housing 104 and on opposite sides of the two computing device magnets 112, 120. In this example a left side repelling magnet 124 is located between the second end 107 of the housing 104 and the first computing device magnet 112, and a right side repelling magnet 124' is located between the first end 105 of the housing 104 and the second computing device magnet 120.

In this example the first computing device magnet 112, the second computing device magnet 120, the left side repelling magnet 124, and the right side repelling magnet 124' are colinear and arranged parallel to the first side 116 of the computing device 100. As in the examples describe above, the left side repelling magnet 124 is spaced from the nearest first computing device magnet 112 by the separation distance 24, and the right side repelling magnet 124' is also spaced from the nearest second computing device magnet 120 by the separation distance 24.

Accordingly and with reference to FIGS. 10 and 11, with this configuration at least a portion of the input device 10 is prevented from attaching to improper locations on either side of the two computing device magnets 112, 120 as described above. Further, this configuration causes the input device body 14 and its longitudinal axis 15 to be clearly skewed relative to the first side 116 of the computing device when the input device 10 is attracted to just one of the first computing device magnet 112 or the second computing device magnet 120. In this manner and in both situations, this configuration provides clear visual communication to the user that the input device 10 is not properly positioned. Further and as with the examples described above, this configuration enables the computing device 100 to ensure proper and secure attachment of an input device while also avoiding or making optional the use of additional charging coils or undesirable markings or visual indicators on the housing 104 that show the proper attachment location for the input device 10.

Figure 12:
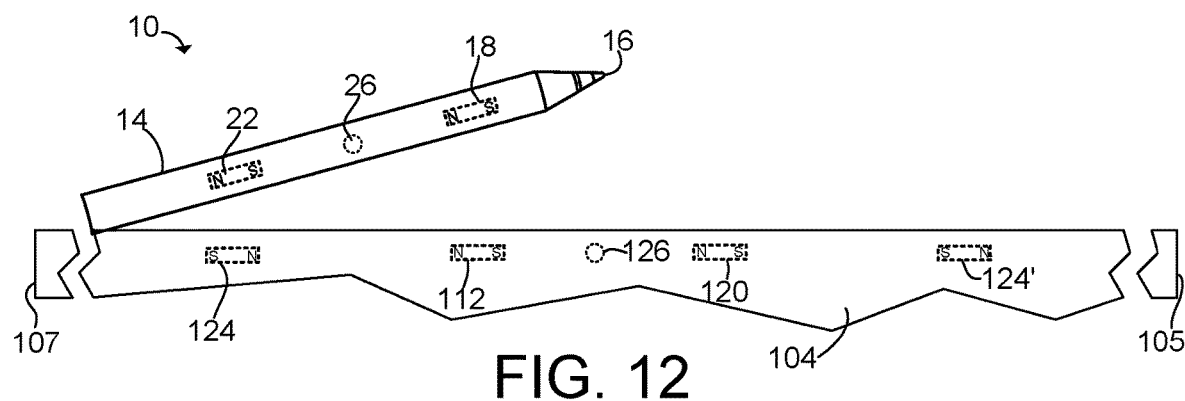
FIGS. 12-13 schematically depict another example of a computing device repelling portions of the input device from attaching to an improper location according to examples of the present disclosure.
Figure 13:
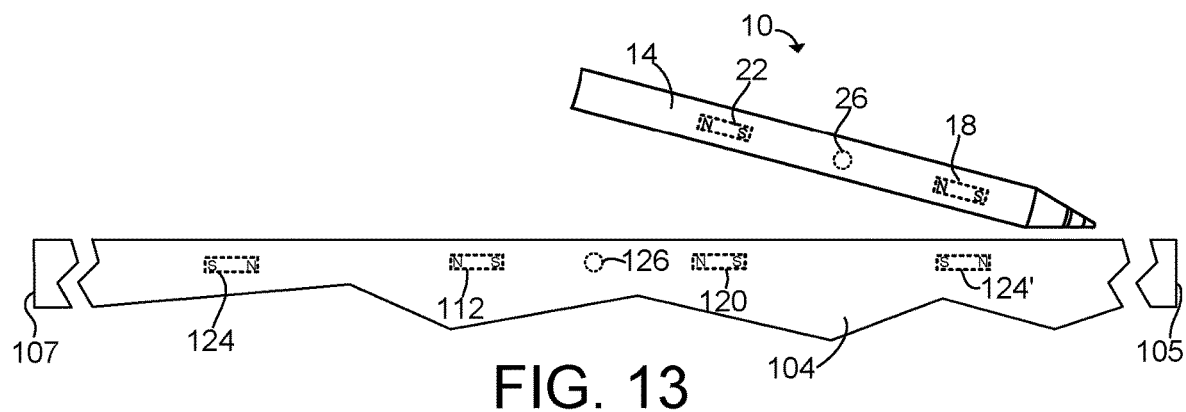

In any of the example configurations of computing device 100 and input device 10 shown in FIGS. 2-11 and described above, the input device is also prevented from attaching to improper locations on either side of the two computing device magnets 112, 120 when the input device faces the opposite direction such that tip 16 faces the first end 105 of the housing 104. For example, and with reference to FIG. 12, in this configuration first computing device magnet 112 repels first input device magnet 18. Similarly, and as shown in FIG. 13, in this configuration second computing device magnet 120 repels the second input device magnet 22.

In other examples, the computing device 100 may utilize two computing device magnets having opposite magnetic pole orientations and at least one repelling magnet having either of the magnetic pole orientations to repel an input device magnet of an input device. With reference now to FIGS. 14-19, in one example the computing device 100 utilizes a first computing device magnet 112 having a first magnetic pole orientation and second computing device magnet 120 having a second magnetic pole orientation opposite to the first magnetic pole orientation. The input device 10 likewise utilizes a first input device magnet 18 having the second magnetic pole orientation and second input device magnet 22 having the first magnetic pole orientation.

Figure 14:
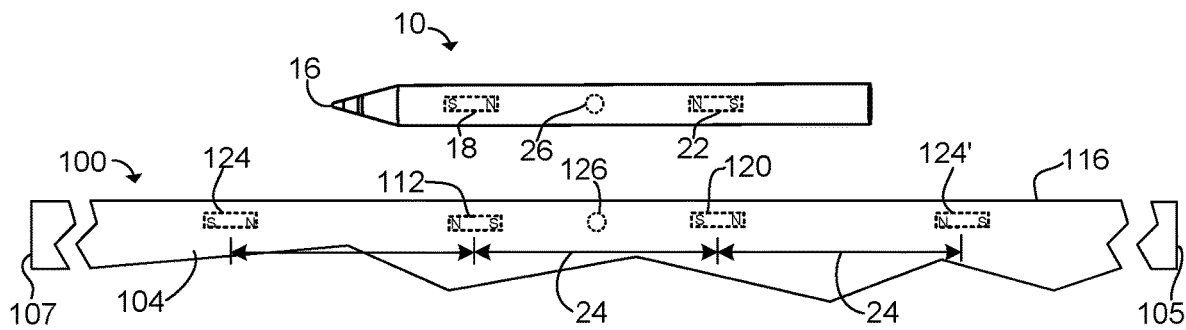
FIGS. 14-19 schematically depict another example of a computing device repelling portions of an input device from attaching to an improper location according to examples of the present disclosure.
Figure 15:
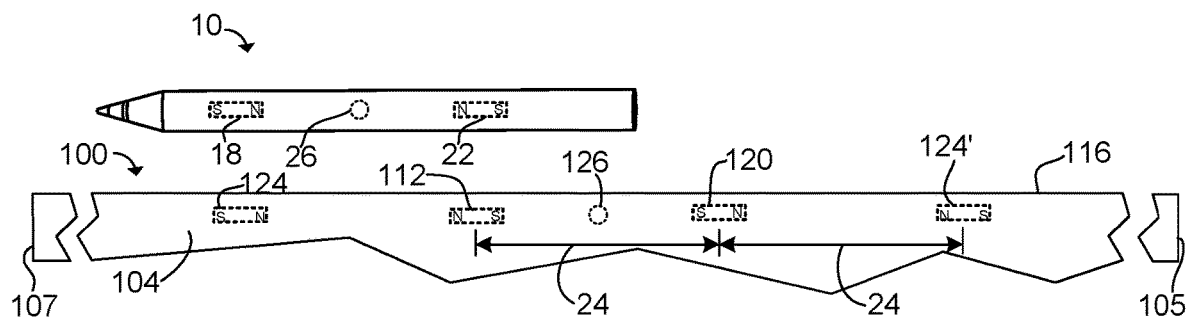
Figure 16:
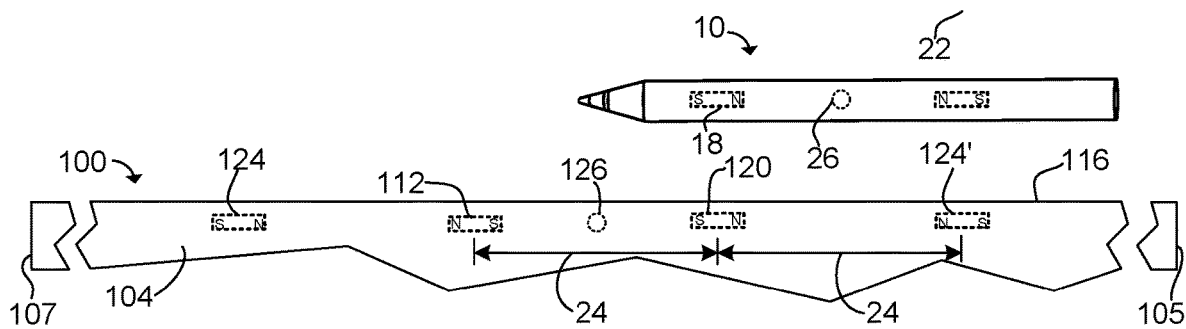
Figure 17:
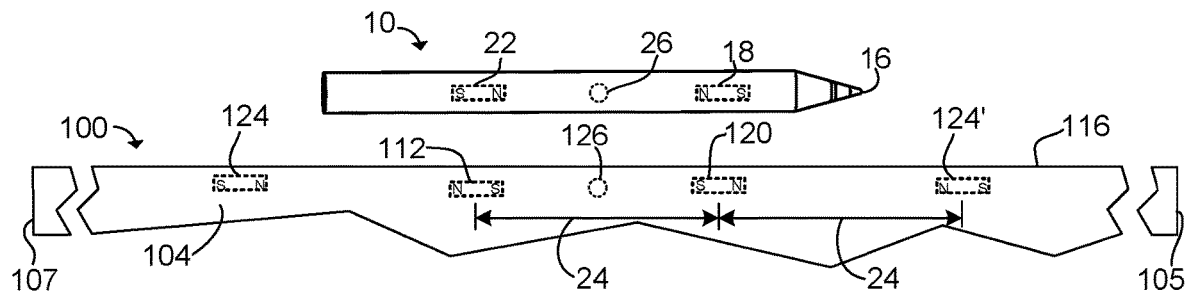
Figure 18:
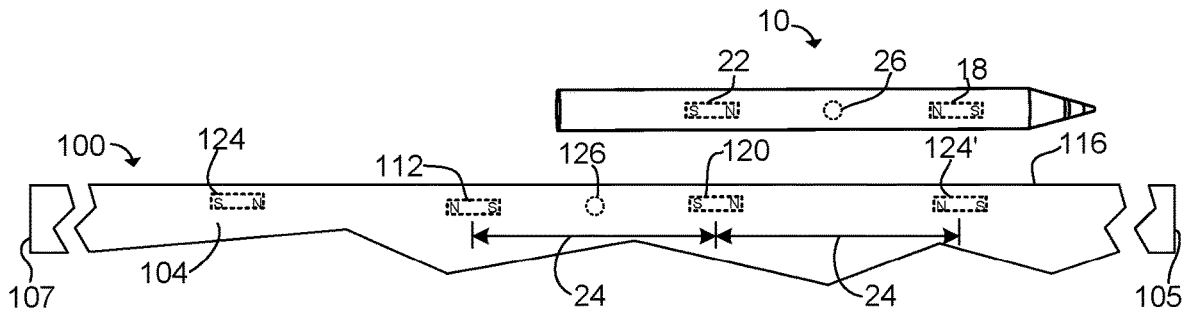
Figure 19:
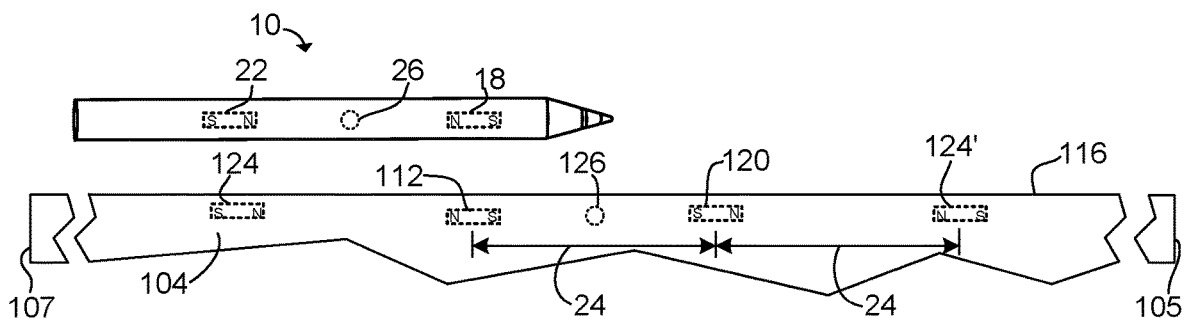

With reference to FIGS. 14 and 17, this configuration enables the input device 10 to be securely attached to the proper attaching and charging location on the computing device 100 whether the tip 16 of the input device points toward the first end 105 or the second end 107 of the housing 104. Additionally, in this example the left side repelling magnet 124 has the second magnetic pole orientation (matching the second computing device magnet 120) and the right side repelling magnet 124' has the first magnetic pole orientation (matching the first computing device magnet 112). With this configuration and as shown in FIGS. 15, 16, 18, and 19, both first and second input device magnets 18, 22 are repelled by a repelling magnet 124/124' and by a computing device magnet 112/120 when the input device is offset from its proper location.

In this manner, this configuration also prevents the input device 10 from attaching to improper locations on either side of the two computing device magnets 112, 120. Further, with this configuration neither of the input device magnets 18, 22 are attracted to a computing device magnet 112, 120 when the input device offset from its proper location as shown. In this manner, both a computing device magnet 112/120 and a repelling magnet 124/124' provide haptic feedback to signal the user that the input device 10 is not located properly located.

In any of the examples described above, all of the computing device magnets and repelling device magnets can be rotated 90 degrees about an axis perpendicular to the first side 116 of the computing device 100, and both of the input device magnets 18, 22 can be rotated in the same direction about an axis perpendicular to the longitudinal axis 15 of the body 14 of the input device to correspondingly rotate the magnetic fields emitted by these magnets. With all magnets rotated in this manner, the functionality and technical effects described above are equally realized in these configurations.

For example and with reference to FIG. 20, in this example each of the magnets of the computing device 100 and input device 10 are rotated 90 degrees about the z-axis with respect to the configuration shown in FIGS. 9-11. In the example of FIG. 20 and like the configuration of FIGS. 9-11, at least a portion of the input device 10 is prevented from attaching to improper locations on either side of the two computing device magnets 112, 120. Further, this configuration causes the input device body 14 and its longitudinal axis 15 to be clearly skewed relative to the first side 116 of the computing device when the input device 10 is attracted to just one of the first computing device magnet 112 or the second computing device magnet 120. In this manner, this configuration also provides clear visual communication to the user that the input device 10 is not properly positioned. Further and as with the examples described above, this configuration enables the computing device 100 to ensure proper and secure attachment of an input device while also avoiding or making optional the use of additional charging coils or undesirable markings or visual indicators on the housing 104 that show the proper attachment location for the input device 10.

FIG. 21 illustrates an example method 300 for preventing at least a portion of an input device from attaching to an improper location on a computing device. Method 300 may be implemented using the example configurations of computing device 100 and input device 100 as described above and other configurations as contemplated by the present disclosure. The following description of method 300 is provided with reference to the components described herein and shown in FIGS. 1-13.

It will be appreciated that the following description of method 300 is provided by way of example and is not meant to be limiting. Therefore, it is to be understood that method 300 may include additional and/or alternative steps relative to those illustrated in FIG. 21. Further, it is to be understood that the steps of method 300 may be performed in any suitable order. Further still, it is to be understood that one or more steps may be omitted from method 300 without departing from the scope of this disclosure. It will also be appreciated that method 300 also may be performed in other contexts using other suitable components.

At 304 method 300 includes providing a computing device comprising: a housing comprising a first side and a first end adjacent to the first side; a first computing device magnet along the first side of the housing, the first computing device magnet having a second magnetic pole orientation opposite to the first magnetic pole orientation; a second computing device magnet along the first side of the housing and spaced by the separation distance from the first computing device magnet, the second computing device magnet having the second magnetic pole orientation; and at least one repelling magnet along the first side of the housing and located between the first end of the housing and the second computing device magnet, wherein the repelling magnet has the first magnetic pole orientation.

At 308 method 300 includes causing the repelling magnet to repel the second input device magnet of the input device when the second input device magnet is moved proximate to the at least one repelling magnet. This is illustrated for example in FIGS. 5 and 10, in which a repelling magnet 124/124' repels the second input device magnet 22 of the input device 10 when the second input device magnet is moved proximate to the repelling magnet 124/124'.

In each of the above-described examples and configurations, where one magnet (e.g., magnet A) is described as having a "first" magnetic pole orientation and another magnet (e.g., magnet B) is described as having a "second" magnetic pole orientation opposite to the first magnetic pole orientation, any suitable magnetic pole orientations may be utilized for magnets A and B provided they are opposite to one another.

Figure 22:
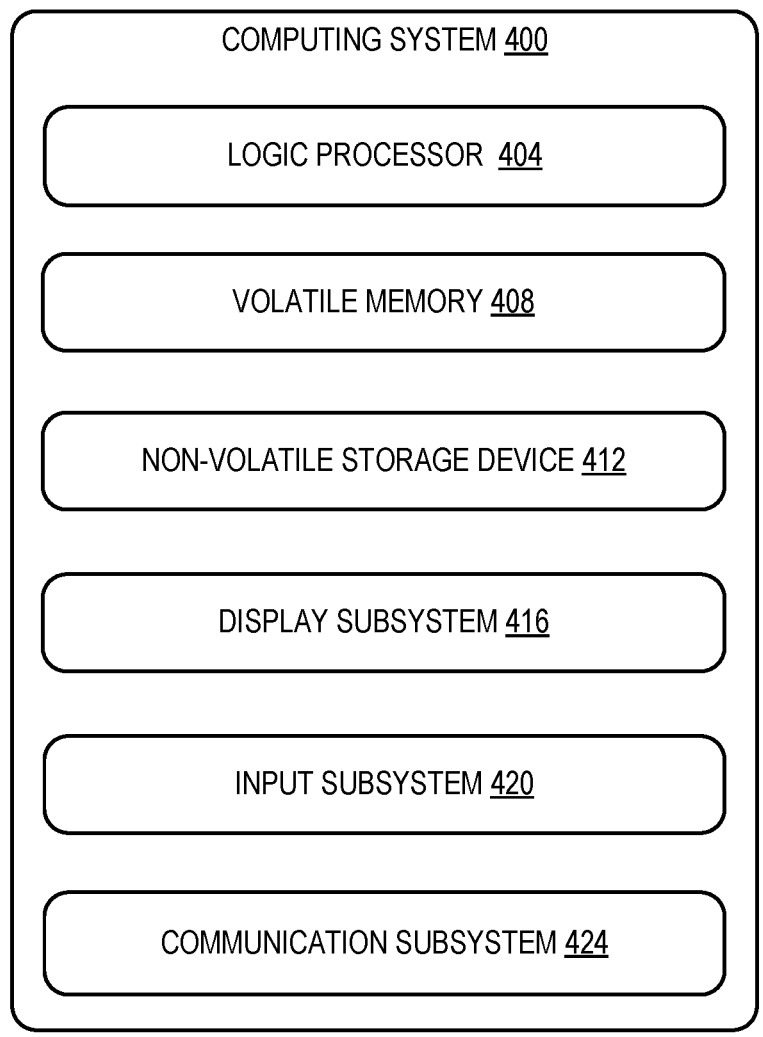
FIG. 22 is a block diagram of an example computing system according to examples of the present disclosure.

FIG. 22 schematically shows a non-limiting embodiment of a computing system 400 shown in simplified form. Computing system 400 may take the form of one or more personal computers, tablet computers, laptop computers, desktop computers, all-in-one displays, home-entertainment computers, gaming devices or consoles, mobile computing devices, mobile communication devices (e.g., smart phones), and/or other computing devices. In the above examples, computing device 100 may comprise computing system 400 or one or more aspects of computing system 400.

Computing system 400 includes a logic processor 404, volatile memory 408, and a non-volatile storage device 412. Computing system 400 may optionally include a display subsystem 416, input subsystem 420, communication subsystem 424, and/or other components not shown in FIG. 22.

Logic processor 404 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 404 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 404 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 412 includes one or more physical devices configured to hold instructions executable by the logic processors to implement the methods and processes described herein. When such methods and processes are implemented, the state of non-volatile storage device 412 may be transformed—e.g., to hold different data.

Non-volatile storage device 412 may include physical devices that are removable and/or built-in. Non-volatile storage device 412 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 412 may include nonvolatile, dynamic, static, read/write, read-only, sequential-access, location-addressable, file-addressable, and/or content-addressable devices. It will be appreciated that non-volatile storage device 412 is configured to hold instructions even when power is cut to the non-volatile storage device 412.

Volatile memory 408 may include physical devices that include random access memory. Volatile memory 408 is typically utilized by logic processor 404 to temporarily store information during processing of software instructions. It will be appreciated that volatile memory 408 typically does not continue to store instructions when power is cut to the volatile memory 408.

Aspects of logic processor 404, volatile memory 408, and non-volatile storage device 412 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 416 may be used to present a visual representation of data held by non-volatile storage device 412. As the herein described methods and processes change the data held by the non-volatile storage device, and thus transform the state of the non-volatile storage device, the state of display subsystem 416 may likewise be transformed to visually represent changes in the underlying data. Display subsystem 416 may include one or more display devices utilizing virtually any type of technology. Such display devices may be combined with logic processor 404, volatile memory 408, and/or non-volatile storage device 412 in a shared enclosure, or such display devices may be peripheral display devices.

When included, input subsystem 420 may comprise or interface with one or more user-input devices such as a touchpad, keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 424 may be configured to communicatively couple various computing devices described herein with each other, and with other devices. Communication subsystem 424 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a computing device configured to prevent attachment of at least a portion of an input device at an improper location on the computing device, the computing device comprising: a housing comprising a first side and a first end adjacent to the first side, the housing comprising a first computing device magnet and a second computing device magnet, each of the first computing device magnet and the second computing device magnet being disposed along the first side of the housing and spaced apart by a separation distance, at least one of the first computing device magnet and the second computing device magnet having a first magnetic pole orientation opposite to a second magnetic pole orientation; and at least one repelling magnet disposed along the first side of the housing and located between the first end of the housing and the second computing device magnet, wherein the at least one repelling magnet has the second magnetic pole orientation.

The computing device may additionally or alternatively include, wherein the first computing device magnet has the first magnetic pole orientation and the second computing device magnet has the second magnetic pole orientation opposite to the first magnetic pole orientation. The computing device may additionally or alternatively include, wherein each of the first computing device magnet and the second computing device magnet having the first magnetic pole orientation opposite to the second magnetic pole orientation. The computing device may additionally or alternatively include, wherein the at least one repelling magnet is spaced from the second computing device magnet by the separation distance. The computing device may additionally or alternatively include, wherein the computing device further comprises a computing device wireless charging coil equidistant between and colinear with the first computing device magnet and the second computing device magnet.

The computing device may additionally or alternatively include, wherein the at least one repelling magnet is a single repelling magnet. The computing device may additionally or alternatively include, wherein the first computing device magnet, the second computing device magnet, and the at least one repelling magnet are colinear and arranged parallel to the first side of the computing device. The computing device may additionally or alternatively include, wherein the computing device further comprises a plurality of repelling magnets along the first side of the housing and having the second magnetic pole orientation. The computing device may additionally or alternatively include, wherein the housing comprises a second end opposite to the first end, the at least one repelling magnet is a first repelling magnet, the computing device further comprising a second repelling magnet along the first side of the housing and located between the second end of the housing and the first computing device magnet, wherein the second repelling magnet has the first magnetic pole orientation.

The computing device may additionally or alternatively include, wherein the second repelling magnet is spaced from the first computing device magnet by the separation distance. The computing device may additionally or alternatively include, wherein the first computing device magnet, the second computing device magnet, the first repelling magnet, and the second repelling magnet are colinear and arranged parallel to the first side of the computing device. The computing device may additionally or alternatively include, wherein the housing comprises a second end opposite to the first end, the at least one repelling magnet is a first repelling magnet, the computing device further comprising a second repelling magnet along the first side of the housing and located between the second end of the housing and the first computing device magnet, wherein the second repelling magnet has the second magnetic pole orientation.

The computing device may additionally or alternatively include, wherein the second repelling magnet is spaced from the first computing device magnet by the separation distance. The computing device may additionally or alternatively include, wherein the first computing device magnet, the second computing device magnet, the first repelling magnet, and the second repelling magnet are colinear and arranged parallel to the first side of the computing device.

Another aspect provides a computing system comprising the computing device as described herein, the system further comprising the input device comprising: an elongated tubular body comprising a first input device magnet and a second input device magnet, the second input device magnet being spaced, by the separation distance, away from the first input device magnet, at least one of the first input device magnet and the second input device magnet having the second magnetic pole orientation to repel the at least one repelling magnet of the computing device. The computing system may additionally or alternatively include, wherein the first input device magnet and the second input device magnet are colinear. The computing system may additionally or alternatively include, wherein each of the first input device magnet and the second input device magnet has the second magnetic pole orientation opposite to the first magnetic pole orientation. The computing system may additionally or alternatively include, wherein the first input device magnet has the first magnetic pole orientation and the second input device magnet has the second magnetic pole orientation opposite to the first magnetic pole orientation. The computing system may additionally or alternatively include, wherein the input device is an electronic pen.

Another aspect provides a method at a computing device for preventing at least a portion of an input device from attaching to an improper location on the computing device, the input device comprising a first input device magnet with a first magnetic pole orientation and a second input device magnet with the first magnetic pole orientation spaced by a separation distance from the first input device magnet, the method comprising: providing the computing device comprising: a housing comprising a first side and a first end adjacent to the first side; a first computing device magnet along the first side of the housing, the first computing device magnet having a second magnetic pole orientation opposite to the first magnetic pole orientation; a second computing device magnet along the first side of the housing and spaced by the separation distance from the first computing device magnet, the second computing device magnet having the second magnetic pole orientation; and at least one repelling magnet along the first side of the housing and located between the first end of the housing and the second computing device magnet, wherein the repelling magnet has the first magnetic pole orientation; and causing the repelling magnet to repel the second input device magnet of the input device when the second input device magnet is moved proximate to the at least one repelling magnet.

It will be understood that the configurations and/or approaches described herein are exemplary in nature, and that these specific embodiments or examples are not to be considered in a limiting sense, because numerous variations are possible.

The subject matter of the present disclosure includes all novel and non-obvious combinations and sub-combinations of the various processes, systems and configurations, and other features, functions, acts, and/or properties disclosed herein, as well as any and all equivalents thereof.

The claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A computing device configured to prevent attachment of at least a portion of an input device at an improper location on the computing device, the computing device comprising:
a housing comprising a first side and a first end adjacent to the first side, the housing comprising a first computing device magnet and a second computing device magnet, each of the first computing device magnet and the second computing device magnet being disposed along the first side of the housing and spaced apart by a separation distance, at least one of the first computing device magnet and the second computing device magnet having a first magnetic pole orientation opposite to a second magnetic pole orientation; and
at least one repelling magnet disposed along the first side of the housing and located between the first end of the housing and the second computing device magnet, wherein the at least one repelling magnet has the second magnetic pole orientation.

2. The computing device of claim 1, the first computing device magnet having the first magnetic pole orientation and the second computing device magnet having the second magnetic pole orientation opposite to the first magnetic pole orientation.

3. The computing device of claim 1, each of the first computing device magnet and the second computing device magnet having the first magnetic pole orientation opposite to the second magnetic pole orientation.

4. The computing device of claim 1, wherein the at least one repelling magnet is spaced from the second computing device magnet by the separation distance.

5. The computing device of claim 1, wherein the computing device further comprises a computing device wireless charging coil equidistant between and colinear with the first computing device magnet and the second computing device magnet.

6. The computing device of claim 1, wherein the at least one repelling magnet is a single repelling magnet.

7. The computing device of claim 1, wherein the first computing device magnet, the second computing device magnet, and the at least one repelling magnet are colinear and arranged parallel to the first side of the computing device.

8. The computing device of claim 1, wherein the computing device further comprises a plurality of repelling magnets along the first side of the housing and having the second magnetic pole orientation.

9. The computing device of claim 2, wherein the housing comprises a second end opposite to the first end, the at least one repelling magnet is a first repelling magnet, the computing device further comprising a second repelling magnet along the first side of the housing and located between the second end of the housing and the first computing device magnet, wherein the second repelling magnet has the first magnetic pole orientation.

10. The computing device of claim 9, wherein the second repelling magnet is spaced from the first computing device magnet by the separation distance.

11. The computing device of claim 10, wherein the first computing device magnet, the second computing device magnet, the first repelling magnet, and the second repelling magnet are colinear and arranged parallel to the first side of the computing device.

12. The computing device of claim 3, wherein the housing comprises a second end opposite to the first end, the at least one repelling magnet is a first repelling magnet, the computing device further comprising a second repelling magnet along the first side of the housing and located between the second end of the housing and the first computing device magnet, wherein the second repelling magnet has the second magnetic pole orientation.

13. The computing device of claim 12, wherein the second repelling magnet is spaced from the first computing device magnet by the separation distance.

14. The computing device of claim 13, wherein the first computing device magnet, the second computing device magnet, the first repelling magnet, and the second repelling magnet are colinear and arranged parallel to the first side of the computing device.

15. A computing system comprising a computing device and an input device, the computing device configured to prevent attachment of at least a portion of the input device at an improper location on the computing device, wherein:
the computing device comprises:
a housing comprising a first side and a first end adjacent to the first side, the housing comprising a first computing device magnet and a second computing device magnet, each of the first computing device magnet and the second computing device magnet being disposed along the first side of the housing and spaced apart by a separation distance, at least one of the first computing device magnet and the second computing device magnet having a first magnetic pole orientation opposite to a second magnetic pole orientation; and
at least one repelling magnet disposed along the first side of the housing and located between the first end of the housing and the second computing device magnet, wherein the at least one repelling magnet has the second magnetic pole orientation; and
the input device comprises:
an elongated tubular body comprising a first input device magnet and a second input device magnet, the second input device magnet being spaced, by the separation distance, away from the first input device magnet, at least one of the first input device magnet and the second input device magnet having the second magnetic pole orientation to repel the at least one repelling magnet of the computing device.

16. The computing system of claim 15, wherein the first input device magnet and the second input device magnet are colinear.

17. The computing system of claim 15, each of the first input device magnet and the second input device magnet having the second magnetic pole orientation opposite to the first magnetic pole orientation.

18. The computing system of claim 15, the first input device magnet having the first magnetic pole orientation and the second input device magnet having the second magnetic pole orientation opposite to the first magnetic pole orientation.

19. The computing system of claim 15, wherein the input device is an electronic pen.

20. A method at a computing device for preventing at least a portion of an input device from attaching to an improper location on the computing device, the input device comprising a first input device magnet with a first magnetic pole orientation and a second input device magnet with the first magnetic pole orientation spaced by a separation distance from the first input device magnet, the method comprising:

providing the computing device comprising:
- a housing comprising a first side and a first end adjacent to the first side;
- a first computing device magnet along the first side of the housing, the first computing device magnet having a second magnetic pole orientation opposite to the first magnetic pole orientation;
- a second computing device magnet along the first side of the housing and spaced by the separation distance from the first computing device magnet, the second computing device magnet having the second magnetic pole orientation; and
- at least one repelling magnet along the first side of the housing and located between the first end of the housing and the second computing device magnet, wherein the repelling magnet has the first magnetic pole orientation; and causing the repelling magnet to repel the second input device magnet of the input device when the second input device magnet is moved proximate to the at least one repelling magnet.

\* \* \* \* \*